F. B. SAPP.
ENDLESS TRACK.
APPLICATION FILED NOV. 9, 1918.

1,411,302.

Patented Apr. 4, 1922.
2 SHEETS—SHEET 1.

Witnesses:
C. E. Wessels.
H. F. Lillis

Inventor
Floyd B. Sapp,
By Joshua R. H. Potts
his Attorney.

F. B. SAPP.
ENDLESS TRACK.
APPLICATION FILED NOV. 9, 1918.

1,411,302. Patented Apr. 4, 1922.
2 SHEETS—SHEET 2.

Witnesses:
C. E. Wessels.
H. F. Lillis

Inventor:
Floyd B. Sapp,
By Joshua R. H. Potts
his Attorney.

UNITED STATES PATENT OFFICE.

FLOYD BURSON SAPP, OF GREEN MOUNTAIN, IOWA.

ENDLESS TRACK.

1,411,302. Specification of Letters Patent. Patented Apr. 4, 1922.

Application filed November 9, 1918. Serial No. 261,809.

*To all whom it may concern:*

Be it known that I, FLOYD B. SAPP, a citizen of the United States, and a resident of the city of Green Mountain, county of Marshall, and State of Iowa, have invented certain new and useful Improvements in Endless Tracks, of which the following is a specification.

My invention relates to improvements in endless track, and has for its object the provision of an improved construction of this character which is capable of adjustments to take up wear and which will not clog with mud, or the like.

Other objects will appear hereinafter.

The invention consists in the combinations and arrangements of parts hereinafter described and claimed.

Figure 1:
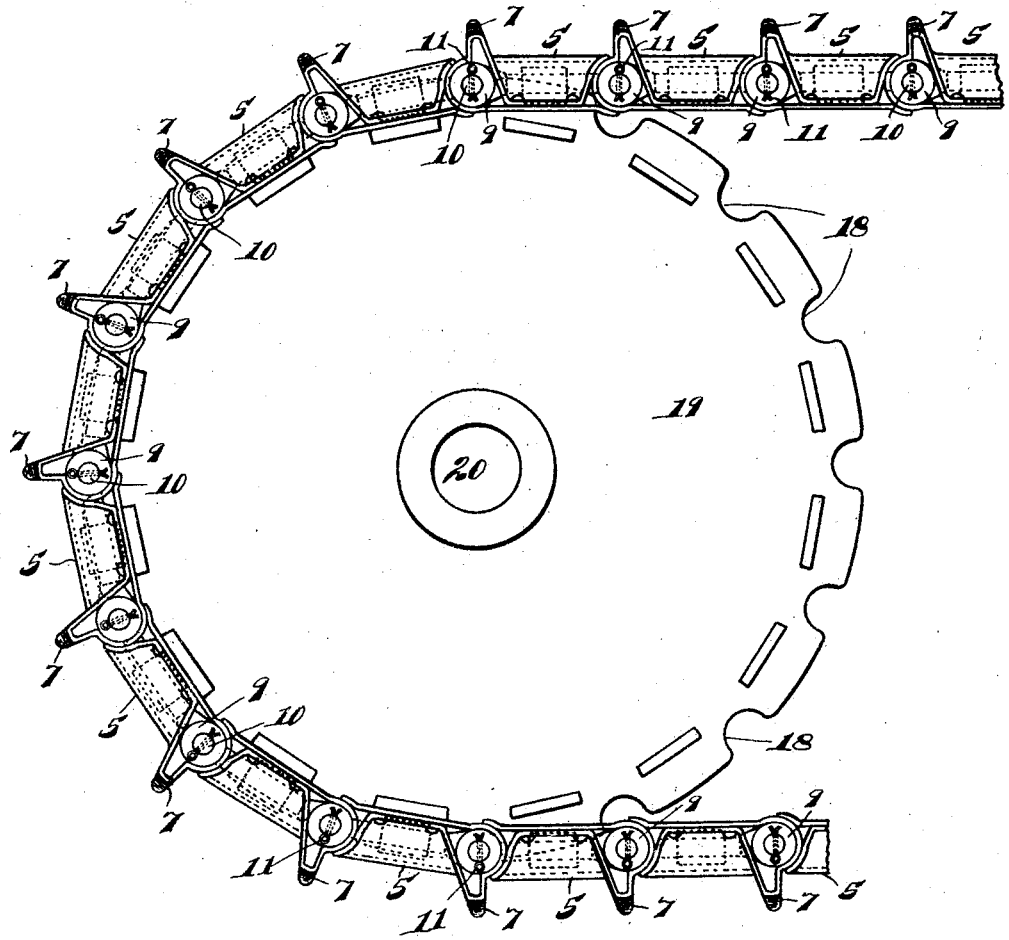
Figure 2:
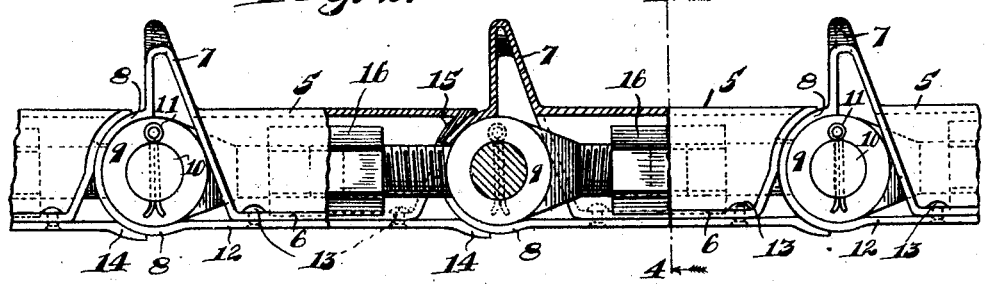
Figure 3:
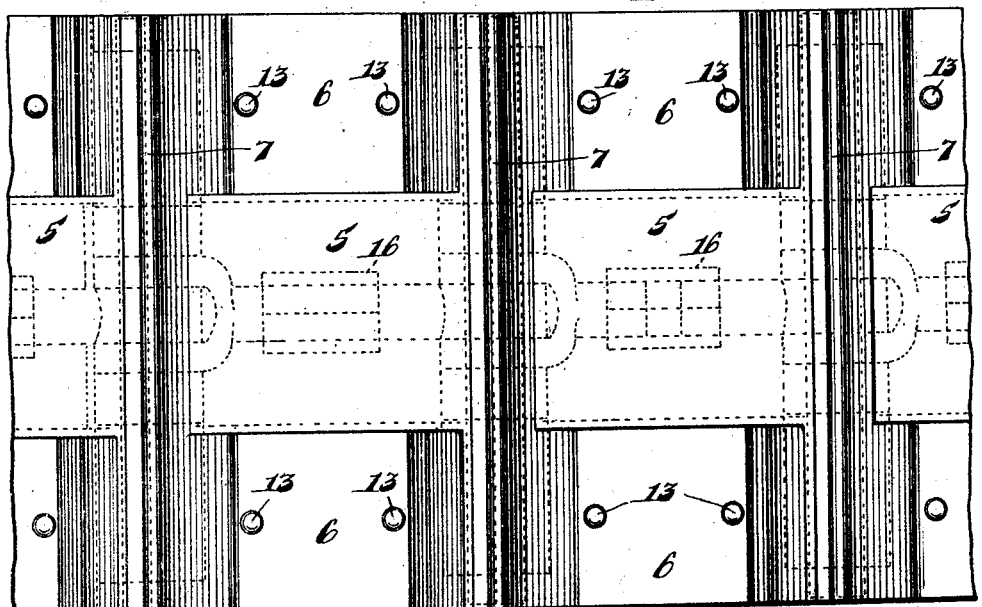
Figure 4:
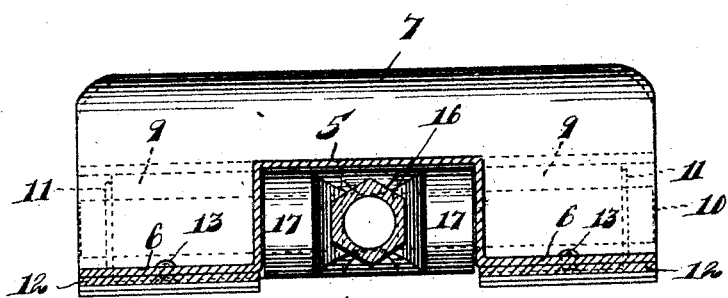

The invention will be best understood by reference to the accompanying drawings forming a part of this specification, and in which, Fig. 1, is a side view of a portion of an endless track embodying the invention, Fig. 2, an enlarged side view of a portion of the same shown partially in longitudinal section, Fig. 3, a top plan view corresponding with Fig. 2, and Fig. 4, a section taken on line 4—4 of Fig. 2.

The preferred form of construction, as illustrated in the drawings, comprises an endless track made up of a plurality of bearing or tread members pivotally linked together to form an endless tread. Each of these bearing members is made up of sheet metal, stamped and bent to form a central elevated portion 5 and depressed side portions 6, provided with a transverse spur or prong 7 extending transversely across the forward end thereof and adapted to imbed itself in the ground to furnish traction, as will be readily understood. Each of the bearing members is also bent at its forward end to form bearings 8 extending across the top or outer portion thereof and arranged at the sides of the lower portion thereof to embrace sleeves 9 loosely mounted on a transverse pivot pin 10 and held thereon by cotter pins 11, as indicated. The lower sides of the bearings 8 are extended rearwardly at 12 and are secured to the under sides of the portions 6 by means of rivets 13, the extreme rearward ends thereof being formed into segmental bearing portions 14 adapted to embrace and ride upon the corresponding bearing portions 8 of the next bearing member to the rear. Likewise, the upper rear portions of each bearing member are formed into a bearing 15 adapted to contact with and ride upon the upper portion of the corresponding bearing 8 of the adjacent plate to the rear. A turn buckle 16 is arranged within the elevated portion 5 of each bearing member and is pivotally connected at each end with the corresponding pivot pin 10, whereby the effective lengths of the bearing members may be readily adjusted to take up wear in the pivotal joints. Each pivot pin 10 carries two rollers 17 arranged on opposite sides of the turn buckle connections and adapted to engage in notches 18 in the periphery of the tractor wheels 19 mounted upon shafts 20 of the vehicle, as indicated, and whereby the tractor is operated in the usual manner, as will be readily understood.

By this arrangement, a simple and effective construction for the purpose is provided, in which adjustments may be readily made to take up wear incident to use, and which will not readily clog with mud or the like. The specific form and arrangement of parts is a simple and effective one for the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. An endless track comprising a plurality of bearing members, each of said bearing members being made of sheet metal and having a central elevated portion and depressed side portions; a transverse spur extending across one end of each of said bearing members; bearings formed at each end of each of said bearing members, the bearing at one end being adapted to engage a transverse pivot pin connection, and the bearing at the other end being adapted to engage the pivot pin bearing on the adjacent bearing member; and an adjustable tie member connecting each pair of adjacent pins, substantially as described.

2. An endless track comprising a plurality of bearing members, each of said bearing members being made of sheet metal and having a central elevated portion and depressed side portions; a transverse spur extending across one end of each of said bearing members; bearings formed at each end of each of said bearing members, the bearing at one end being adapted to engage a transverse pivot pin connection, and the bearing at the other end being adapted to engage the pivot pin bearing on the adjacent bearing member; and an adjustable turn buckle connecting each pair of adjacent pins, substantially as described.

3. An endless track comprising a plurality of bearing members, each of said bearing members having a bearing at each end thereof, the bearing at one end being arranged to engage a transverse pivot pin connection, and the bearing at the other end being arranged to engage said pivot pin bearing on the adjacent bearing member and adjustable tie members for connecting adjacent pins, substantially as described.

4. An endless track comprising a plurality of bearing members, each made of sheet metal and bent to form a central raised portion and depressed side portions, one end of each of said bearing members being formed into a transverse prong and a bearing adapted to engage a transverse pivot pin, the other end of each of said bearing members being provided with a bearing adapted to engage the pivot pin bearing on the adjacent bearing member, and turn buckles connecting adjacent pins, substantially as described.

5. An endless track comprising a plurality of bearing members, each of which being formed from a single piece of material; prongs integrally formed on said members adapted to be embedded in the ground; and turn buckles connecting said members together, substantially as described.

6. In a tractor wheel, the combination of an endless track comprising bearing members formed from a single piece of material having a central elevated portion and depressed side portions; a transverse spur extending across one end of each of said bearing members; bearings formed at each end of said bearing members, one of said end bearings adapted to engage a transverse pivot pin connection and the other of said end bearings adapted to engage the pivot pin bearing on the adjacent bearing member; an adjustable turn buckle connecting each pair of adjacent pins; and rollers carried by said pivot pin adapted to engage the periphery of said tractor wheel, substantially as described.

7. In a tractor wheel, the combination of an endless track comprising bearing members; a transverse spur extending across one end of each of said bearing members; bearings formed at each end of said bearing members, one of said end bearings adapted to engage a transverse pivot pin connection and the other of said end bearings adapted to engage the pivot pin bearing on the adjacent bearing member; an adjustable tie member connecting each pair of adjacent pins; and rollers carried by said pins on opposite sides of the said tie member connection, substantially as described.

In testimony whereof I have signed my name to this specification in the presence of two subscribing witnesses.

FLOYD BURSON SAPP.

Witnesses:
S. E. ZINK,
GUY G. LANE.